(12) United States Patent
Abram et al.

(10) Patent No.: US 7,581,710 B2
(45) Date of Patent: Sep. 1, 2009

(54) THERMALLY ISOLATED ACTUATOR WITH TEMPORARY CONTACTING LINKAGE FOR AN EXHAUST VALVE

(75) Inventors: Kwin Abram, Columbus, IN (US);
Joseph Callahan, Greenwood, IN (US);
Robin Willats, Columbus, IN (US);
David Lee McCrary, Brownstown, IN (US)

(73) Assignee: EMCON Technologies LLC, Wilmington, DE (US)

( * ) Notice: Subject to any disclaimer, the term of this patent is extended or adjusted under 35 U.S.C. 154(b) by 246 days.

(21) Appl. No.: 11/491,864

(22) Filed: Jul. 24, 2006

(65) Prior Publication Data

US 2008/0017817 A1    Jan. 24, 2008

(51) Int. Cl.
*F16K 31/44* (2006.01)

(52) U.S. Cl. .................... 251/77; 251/248; 251/305; 123/568.17

(58) Field of Classification Search ............ 251/77, 251/248, 305, 129.11; 123/568.17, 568.18
See application file for complete search history.

(56) References Cited

U.S. PATENT DOCUMENTS 5,354,234 A * 10/1994 Arold et al. ................. 454/69
5,401,001 A * 3/1995 Cook et al. ................. 251/308
5,797,585 A * 8/1998 Auvity ........................ 251/80

FOREIGN PATENT DOCUMENTS

| DE | 102004030821 | 1/2006 |
|----|--------------|--------|
| EP | 0972918 | 1/2000 |
| JP | 2001090859 | 4/2001 |

OTHER PUBLICATIONS

International Search Report and Written Opinion dated Dec. 19, 2007.

* cited by examiner

*Primary Examiner*—John K Fristoe, Jr.
(74) *Attorney, Agent, or Firm*—Carlson Gaskey & Olds

(57) ABSTRACT

An exhaust valve assembly includes a valve body, a valve supported by a shaft within the valve body, and an actuator that moves the valve relative to the valve body to control exhaust flow. The actuator is thermally isolated from the valve by a linkage mechanism that cooperates with exhaust flow to move the valve between open and closed positions. The actuator temporarily contacts the linkage mechanism to initiate opening and closing movement but then moves out of contact with the linkage mechanism as the exhaust flow exerts a force against the valve to move the valve to a fully open or fully closed position. This temporary contact between the linkage mechanism and the actuator reduces heat transfer from the valve to the actuator.

20 Claims, 2 Drawing Sheets

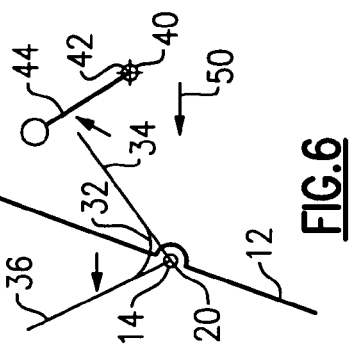
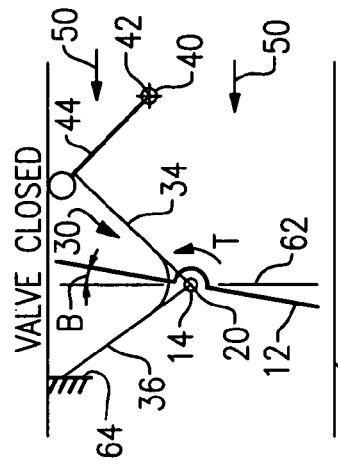
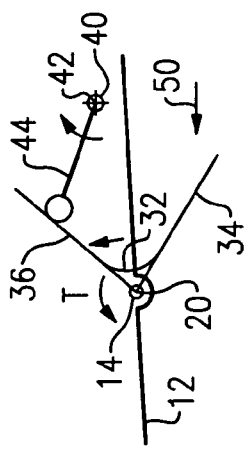
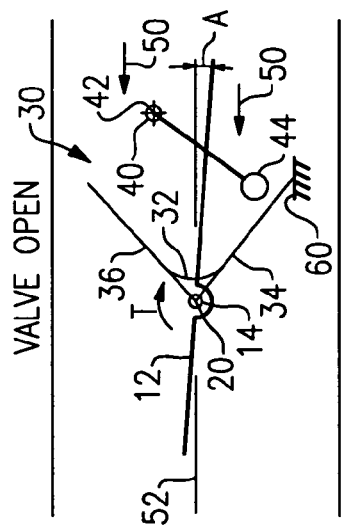
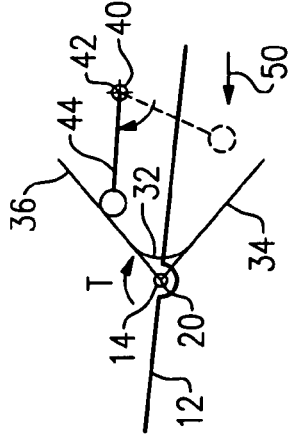
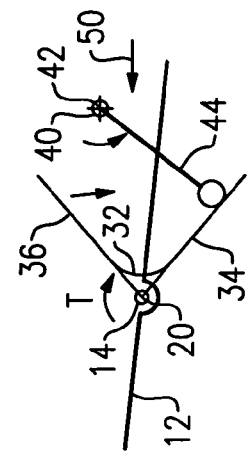
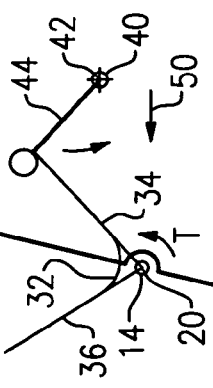

THERMALLY ISOLATED ACTUATOR WITH TEMPORARY CONTACTING LINKAGE FOR AN EXHAUST VALVE

TECHNICAL FIELD

The subject invention relates to a thermally isolated actuator with a temporary contacting linkage mechanism for an exhaust valve that reduces heat transfer from the exhaust valve to the actuator.

BACKGROUND OF THE INVENTION

Exhaust valve assemblies include a flapper valve that is supported on a shaft within an exhaust tube. An actuator, mounted externally to the flapper valve, drives the shaft to move the flapper valve within the exhaust tube to control exhaust flow. Actuators can include electric actuators such as motors or solenoids, or vacuum actuators, for example.

Each type of actuator has an operating temperature limitation. Exhaust gases that flow through the exhaust tube can reach very high temperature levels. Disadvantageously, these high temperatures can be transferred to the actuator via the shaft, which can adversely affect operation of the actuator.

One proposed solution has been to extend a length of the shaft to reduce the temperature at the actuator. However, increasing shaft length makes the overall packaging of the exhaust valve assembly more complex and bulky, which is not desirable. Further, this drives up the cost for an exhaust valve assembly in order to accommodate temperature limitations of the actuator.

Thus, there is a need for an improved exhaust valve assembly that reduces heat transfer from a valve to an actuator, while additionally providing a more flexible and compact design configuration.

SUMMARY OF THE INVENTION

An exhaust valve assembly includes a thermally isolated actuator that reduces heat transfer from a valve to an actuator. The actuator temporarily contacts a linkage mechanism, which is coupled to the valve, to initiate opening or closing movement of the valve.

In one example, the exhaust valve assembly includes a valve body and a valve supported on a valve shaft for movement within the valve body. The actuator moves the valve within the valve body between an open position and a closed position. The linkage mechanism is coupled to the valve shaft at a position remote from the valve. The actuator only contacts the linkage mechanism to initiate opening and closing movement of the valve and subsequently moves out of contact with the linkage mechanism to thermally isolate the actuator from the valve, as exhaust flow continues to move the valve to one of a fully open or closed position.

In one configuration, the linkage mechanism comprises a valve gear that pivots about a valve axis, and which has at least a first tooth and a second tooth. The actuator includes an arm that pivots about an actuator axis. In one example, the actuator and valve axes are offset from each other. The arm contacts the first tooth to initiate opening movement of the valve and contacts the second tooth to initiate closing movement. The first tooth engages a first valve stop when the valve is in the open position and the second tooth engages a second valve stop when the valve is in the closed position.

The temporary contact between the linkage mechanism and the arm of the actuator serves to reduce the heat transmission along the valve shaft from the valve to the actuator.

These and other features of the present invention can be best understood from the following specification and drawings, the following of which is a brief description.

BRIEF DESCRIPTION OF THE DRAWINGS

FIG. 2 is a schematic side view of the exhaust valve assembly of FIG. 1 in an open position.

FIG. 3 is a schematic side view of the exhaust valve assembly of FIG. 1 in a closed position.

FIG. 4 is a schematic side view of an actuator initiating closing movement.

FIG. 5 is a schematic side view of a changeover of torque direction during closing.

FIG. 6 is a schematic side view of the actuator moving out of contact with a linkage mechanism as the exhaust valve assembly moves to a fully closed position.

FIG. 7 is a schematic side view of the actuator initiating opening movement.

FIG. 8 is a schematic side view of the actuator moving out of contact with the linkage mechanism as the exhaust valve assembly moves to a fully open position.

DETAILED DESCRIPTION OF THE PREFERRED EMBODIMENT

Figure 1:
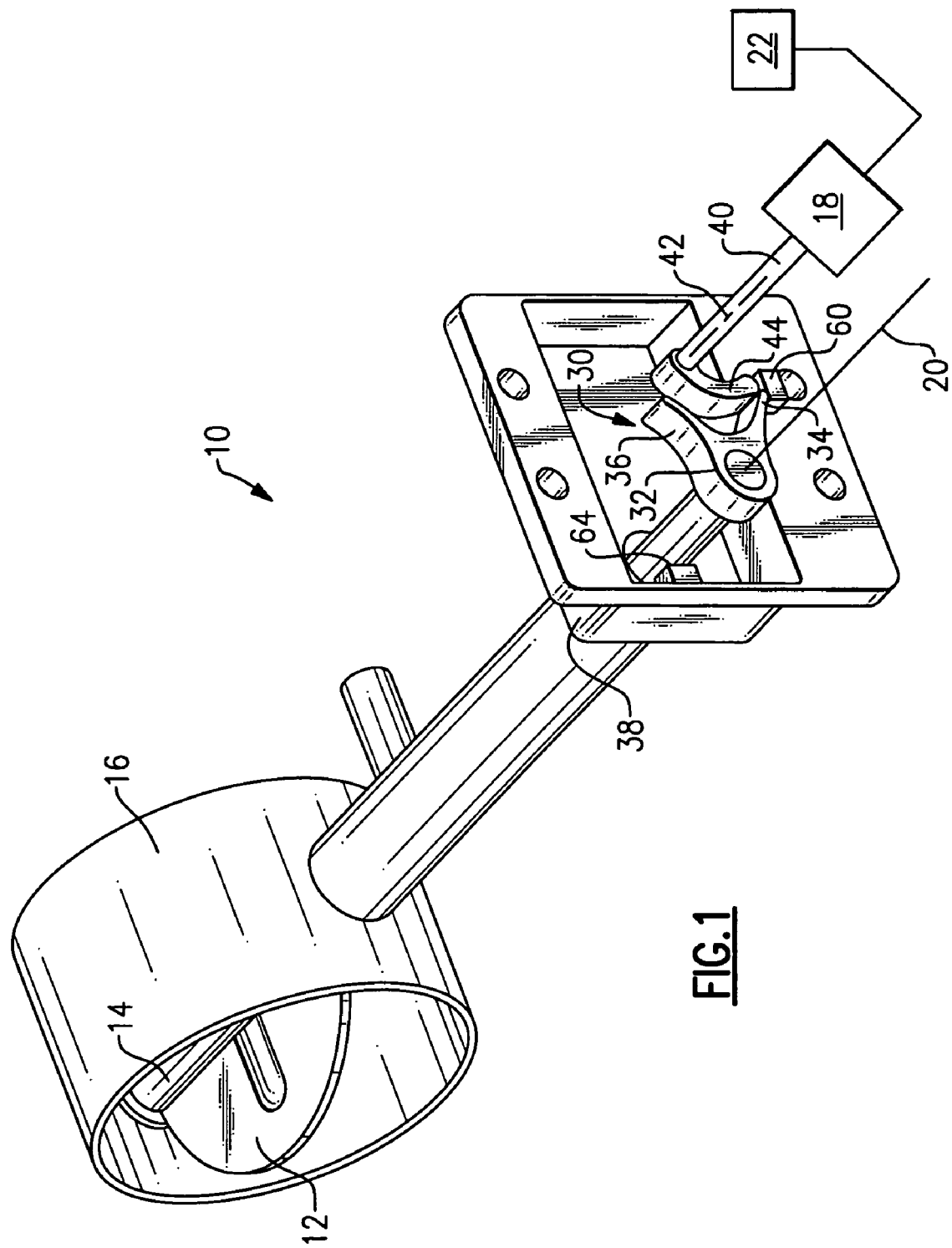
FIG. 1 is a perspective view of an exhaust valve assembly incorporating the subject invention.

An exhaust valve assembly is shown generally at 10 in FIG. 1. The exhaust valve assembly 10 includes a valve 12 that is supported on a shaft 14. In the example shown, the valve 12 comprises a flapper valve that is mounted within a valve housing or valve body 16, which comprises a tube. The valve body 16 is part of an exhaust system component and exhaust gases flow through the valve body 16.

An actuator 18 is used to initiate movement of the valve 12 between open and closed positions. The valve 12 pivots about an axis 20 defined by the shaft 14. The valve 12 is fixed to the shaft 14 such that the shaft 14 and valve 12 pivot together about the axis 20. The actuator 18 can be any type of actuator, such as an electric actuator or a vacuum actuator, for example. In the example shown, the actuator 18 comprises an electric actuator, such as a motor or solenoid. A controller 22 cooperates with the actuator 18 to control exhaust flow through the valve body 16 by varying the position of the valve 12, as known.

During operation, the exhaust gases in the valve body 16 can reach very high temperatures. Thus, the valve 12 is exposed to high heat levels. In traditional configurations, the actuator 18 is directly coupled to the shaft 14, and heat is transferred along the shaft 14 from the valve 12 to the actuator 18. If the heat transfer level is too high, performance of the actuator 18 can be adversely affected. In order to reduce the amount of heat transferred to the actuator 18, the subject invention utilizes a linkage mechanism 30 to thermally isolate the actuator 18 from the valve 12 in order to reduce an amount of heat transfer from the valve 12 to the actuator 18.

As shown, the linkage mechanism 30 comprises a valve gear 32 that includes at least a first tooth 34 and a second tooth 36. The valve gear 32 is fixed to the shaft 14 at a position remote from the valve 12 and rotates about the axis 20. The valve 12 rotates within the tube defined by the valve body 16, and the shaft 14 extends out of the valve body 16 into a shaft housing 38 that is connected to the valve body 16. The valve gear 32 is mounted to the shaft 14 at a position within the shaft housing 38.

The actuator 18 includes an output shaft 40 that defines an actuator axis 42. An arm 44 is coupled to the output shaft 40. The arm 44 pivots with the output shaft 40 about the actuator axis 42. In the example shown, the actuator axis 42 and the axis 20 of the valve 12 are offset and parallel to each other.

The arm 44 temporarily contacts the first tooth 34 and the second tooth 36 to initiate opening and closing movement of the valve 12. The arm 44 moves out of contact with the first 34 and second 36 teeth, and exhaust flow exerts a force against the valve 12 to continue to move the valve 12 into a fully opened or fully closed position without requiring any additional input from the actuator 18. This will be discussed in greater detail below.

FIG. 2 shows the valve 12 in the open position with exhaust flow indicated by arrows 50. Note that the valve 12 is positioned to be slightly angled relative to a horizontal axis 52. In the example show, the valve 12 is positioned at an angle of attack A that is approximately five degrees, however, other angles could be used depending upon the application. In this position, the exhaust flow 50 exerts a load on the valve 12 with a resultant torque T being exerted in a clockwise direction about axis 20. This resultant torque T holds the valve 12 in the open position without any assistance from the actuator 18.

Further, when in the open position, the first tooth 34 abuts against a first valve stop 60. The first valve stop 60 prevents the valve 12 from over-rotating as the valve 12 moves from the closed position to the open position.

FIG. 3 shows the valve 12 in the closed position. The valve 12 is angled relative to a vertical axis 62 by an angle B when in the closed position. Again, this angle B is varied depending upon the application. In this position, the exhaust flow 50 exerts a load on the valve 12 with the resultant torque T being exerted in a counter-clockwise direction about the axis 20. This resultant torque T holds the valve 12 in the closed position without any assistance from the actuator 18.

When in the closed position, the second tooth 36 abuts against a second valve stop 64. The second valve stop 64 prevents the valve 12 from over-rotating as the valve 12 moves from the open position to the closed position. The valve gear 32 is a pivoting member that pivots back and forth between the first 60 and second 64 valve stops. Thus, the valve gear 32 is constrained from rotating 360 degrees about the axis 20 by the first 60 and second 64 valve stops.

As discussed above, the arm 44 of the actuator 18 temporarily contacts one of the first tooth 34 and second tooth 36 to initiate one of opening and closing movement. In FIG. 4, the arm 44 is pivoting in a clockwise direction about the actuator axis 42 to contact the second tooth 36 to initiate closing movement. Contact between the arm 44 and second tooth 36 causes the valve gear 32 to pivot in a counter-clockwise direction about axis 20, which likewise causes the shaft 14 and valve 12 to pivot in a counter-clockwise direction about axis 20.

As shown in FIG. 5, the arm 44 continues to pivot, and remains in contact with, the second tooth 36 as the resultant torque T of the valve 12 changes from a clockwise orientation (FIG. 4) to a counter-clockwise orientation (FIG. 5). The arm 44 then moves out of contact with the second tooth 36 as shown in FIG. 6, and the exhaust flow 50 moves the valve 12 into the fully closed position (FIG. 3).

The opposite occurs when the valve 12 is moved from the closed position to the open position. As shown in FIG. 7, the arm 44 pivots in a counter-clockwise direction about actuator axis 42 and moves into contact with the first tooth 34 to initiate opening movement of the valve 12. This contact causes the valve gear 32 to pivot in a clockwise direction about the axis 20, which likewise causes valve shaft 14 and valve 12 to rotate in a clockwise direction about the axis 20.

The arm 44 continues to pivot and remains in contact with the first tooth 34 as the resultant torque T of the valve 12 changes from a counter-clockwise orientation (FIG. 7) to a clockwise orientation (FIG. 8). The arm 44 then moves out of contact with the first tooth 34, and the exhaust flow 50 moves the valve 12 into the fully open position (FIG. 2).

Thus, by taking advantage of flow dynamics from exhaust gas flowing through the valve body 16, in combination with shaft and valve geometry, the actuator 18 is not required to directly contact the valve shaft 14 at fully open and closed positions. However, the actuator 18 still serves to move the valve 12 between open and closed positions. The actuator 18 is only in contact with the valve 12 and shaft 14 (via the valve gear 32) for an amount of time that is enough to transition the valve 12 past a point where the resultant shaft torque T changes direction. Thus, due to the limited contact between the actuator and valve 12, the maximum temperature the actuator 18 experiences is significantly less than if there were continuous contact between the valve 12 and actuator 18. As such, the actuator 18 can be de-contented for lower temperatures, or the valve body 16 could be made more compact as shaft length no longer needs to be increased to keep the actuator away from the valve.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An exhaust valve assembly comprising:
    a valve body;
    a valve supported on a valve shaft for movement within said valve body;
    an actuator that moves said valve within said valve body between an open position and a closed position; and
    a linkage mechanism coupled to said valve shaft wherein said actuator contacts said linkage mechanism to initiate opening and closing movement of said valve and subsequently moves out of contact with said linkage mechanism to thermally isolate said actuator from said valve as exhaust flow continues to move said valve to one of the open or closed positions, and wherein said linkage comprises a valve gear having at least a first tooth and a second tooth, said actuator temporarily contacting said first tooth to initiate opening movement and temporarily contacting said second tooth to initiate closing movement.

2. The exhaust valve assembly according to claim 1 wherein said actuator includes an arm that pivots about an actuator axis, and wherein said valve and said first and second teeth pivot about a valve axis defined by said valve shaft.

3. The exhaust valve assembly according to claim 2 wherein said valve axis is offset from said actuator axis.

4. The exhaust valve assembly according to claim 2 including a first valve stop and a second valve stop wherein said first tooth abuts against said first valve stop when said valve is in said open position and said second tooth abuts against said second valve stop when said valve is in said closed position.

5. The exhaust valve assembly according to claim 4 wherein said exhaust flow provides a resultant torque at said valve in a first direction about a valve axis to hold said valve in said open position.

6. The exhaust valve assembly according to claim 5 wherein said arm pivots in a first direction about said actuator axis into contact with said second tooth to initiate closing movement of said valve by pivoting said valve in second direction about said valve axis opposite from said first direction.

7. The exhaust valve assembly according to claim 6 wherein said arm continues to pivot about said actuator axis in said first direction and moves out of contact with said second tooth with said exhaust flow continuing to push said valve into said closed position until said second tooth abuts against said second valve stop.

8. The exhaust valve assembly according to claim 7 wherein said exhaust flow provides a resultant torque at said valve in said second direction about said valve axis to hold said valve in said closed position.

9. The exhaust valve assembly according to claim 8 wherein said arm pivots in a second direction about said actuator axis opposite said first direction and moves into contact with said first tooth to initiate opening movement of said valve by pivoting said valve in said first direction about said valve axis.

10. The exhaust valve assembly according to claim 9 wherein said arm continues to pivot about said actuator axis in said second direction and moves out of contact with said first tooth with said exhaust flow continuing to push said valve into said open position until said first tooth abuts against said first valve stop.

11. The exhaust valve assembly according to claim 1 wherein said valve gear is constrained from rotating 360 degrees about an axis defined by said valve shaft by at least one valve stop.

12. A method for moving an exhaust valve assembly between an open position and a closed position comprising the steps of:
(a) providing a valve body, a valve supported on a valve shaft for movement within the valve body, an actuator for controlling movement of the valve, and a linkage mechanism coupled to the valve shaft and wherein the linkage mechanism includes a valve gear having at least a first tooth and a second tooth that pivot about a valve axis, and the actuator includes an arm that pivots about an actuator axis;
(b) contacting the linkage mechanism with the actuator to initiate one of opening and closing movement of the valve including temporarily contacting the first tooth with the arm to initiate opening movement, and temporarily contacting the second tooth with the arm to initiate closing movement; and
(c) subsequently moving the actuator out of contact with the linkage mechanism to thermally isolate the actuator from the valve as exhaust flow continues to move the valve to one of the open and closed positions.

13. The method according to claim 12 wherein the exhaust flow exerts a resultant torque on the valve in a first direction about the valve axis to hold the valve in the closed position, and including pivoting the arm in a first direction about the actuator axis to contact the first tooth to initiate opening movement of the valve by rotating the valve in a second direction about the valve axis opposite the first direction; continuing to pivot the arm in the first direction until the arm moves out of contact with the first tooth, and exerting exhaust flow against the valve to continue movement of the valve into the open position until the first tooth contacts a first valve stop.

14. The method according to claim 13 wherein the exhaust flow exerts a resultant torque on the valve in the second direction about the valve axis to hold the valve in the open position, and including pivoting the arm in a second direction about the actuator axis, opposite the first direction, to contact the second tooth to initiate closing movement of the valve by rotating the valve in the first direction about the valve axis; continuing to pivot the arm in the second direction until the arm moves out of contact with the second tooth, and exerting exhaust flow against the valve to continue movement of the valve into the closed position until the second tooth contacts a second valve stop.

15. The method according to claim 12 wherein step (c) includes exerting a force generated by the exhaust flow against the valve to move the valve toward the one of the open and closed positions subsequent to the actuator moving out of contact with the linkage mechanism.

16. The method according to claim 15 including providing a resultant torque at the valve in one direction about a valve axis to hold the valve in the one of the open and closed positions without assistance from the actuator and providing a resultant torque at the valve in an opposite direction about the valve axis to hold the valve in the other of the open and closed positions without assistance from the actuator.

17. The method according to claim 12 wherein the valve body defines an exhaust gas flow path for an exhaust system and including generating exhaust gas forces against the valve to move the valve within the exhaust gas flow path to vary the exhaust gas flow within the exhaust system.

18. The exhaust valve assembly according to claim 1 wherein a force generated by the exhaust flow is exerted against said valve to move said valve toward said one of the open and closed positions subsequent to said actuator moving out of contact with said linkage mechanism.

19. The exhaust valve assembly according to claim 18 wherein a resultant torque is provided at said valve in one direction about a valve axis to hold said valve in the one of the open and closed positions without assistance from said actuator and wherein a resultant torque is provided at said valve in an opposite direction about said valve axis to hold said valve in the other of the open and closed positions without assistance from said actuator.

20. The exhaust valve assembly according to claim 1 wherein said valve body defines an exhaust gas flow path for an exhaust system and wherein exhaust gas forces are exerted against said valve to move said valve within the exhaust gas flow path to vary the exhaust gas flow within the exhaust system.

* * * * *